(12) United States Patent
Storm et al.

(10) Patent No.: US 9,639,100 B2
(45) Date of Patent: May 2, 2017

(54) POWER-SENSING CIRCUIT FOR WIRELESS ZONE SENSORS

(75) Inventors: Timothy Wayne Storm, Tyler, TX (US); Daniel J. Mitchell, Gilmer, TX (US)

(73) Assignee: Trane International Inc., Piscataway, NJ (US)

( * ) Notice: Subject to any disclaimer, the term of this patent is extended or adjusted under 35 U.S.C. 154(b) by 441 days.

(21) Appl. No.: 13/312,487

(22) Filed: Dec. 6, 2011

(65) Prior Publication Data

US 2013/0140016 A1    Jun. 6, 2013

(51) Int. Cl.
| F24D 19/10 | (2006.01) |
| F24F 11/00 | (2006.01) |
| G05D 23/275 | (2006.01) |
| G05D 23/19 | (2006.01) |

(52) U.S. Cl.
CPC ........ *G05D 23/1934* (2013.01); *F24F 11/006* (2013.01); *F24F 2011/0067* (2013.01); *F24F 2011/0068* (2013.01)

(58) Field of Classification Search
CPC ...... F24F 11/0012; F24F 11/006; F24F 11/06; F24D 19/1009; G05D 23/27529; G05D 23/185; G05D 23/1934
USPC ......................................................... 236/1 B
See application file for complete search history.

(56) References Cited

U.S. PATENT DOCUMENTS

| 3,944,925 | A | * | 3/1976 | De Laune | ........................ | 455/76 |
| 4,431,134 | A | | 2/1984 | Hendricks et al. | | |
| 5,460,327 | A | | 10/1995 | Hill et al. | | |
| 5,689,248 | A | | 11/1997 | Esfahani et al. | | |
| 5,927,599 | A | | 7/1999 | Kath | | |
| 6,990,317 | B2 | * | 1/2006 | Arnold | ............................ | 455/59 |
| 7,537,171 | B2 | | 5/2009 | Mueller et al. | | |
| 7,600,694 | B2 | * | 10/2009 | Helt et al. | ...................... | 236/1 B |
| 2005/0201397 | A1 | * | 9/2005 | Petite | ............................ | 370/401 |
| 2006/0097063 | A1 | * | 5/2006 | Zeevi | ........................... | 236/49.3 |
| 2009/0008463 | A1 | * | 1/2009 | Holland et al. | ................. | 236/51 |

(Continued)

FOREIGN PATENT DOCUMENTS

DE         EP0638886 A1 *  2/1995

OTHER PUBLICATIONS

Patrick, Method for transmitting a message between two subscriber stations and device for performing the method, Feb. 15, 1995, EP0638886A1, Whole Document.*

*Primary Examiner* — Larry Furdge
(74) *Attorney, Agent, or Firm* — Conley Rose, P.C.; J. Robert Brown, Jr.; Michael J. Schofield

(57) ABSTRACT

A system and method for controlling a heating, ventilating, and air conditioning (HVAC) system in a dwelling is provided. The system includes a plurality of wireless thermostats disposed throughout multiple zones within the dwelling and operable to control climate conditions in the corresponding zones. The system further includes a primary power source operable to supply power to thermostats for operating in a high-power mode when operatively connected thereto. The thermostats each include a secondary power source operable to supply power to the thermostats for operating in a low-power mode when the corresponding thermostat is not powered by the primary power source. Thermostats operating in the high-powered mode are operable to receive and repeat signals originating from one or more thermostats operating in the low-power mode.

17 Claims, 4 Drawing Sheets

(56) References Cited

U.S. PATENT DOCUMENTS

| | | | |
|---|---|---|---|
| 2009/0099697 A1* | 4/2009 | Li et al. | 700/276 |
| 2009/0192653 A1* | 7/2009 | Songukrishnasamy et al. | 700/282 |
| 2010/0114387 A1* | 5/2010 | Chassin | 700/286 |

\* cited by examiner

POWER-SENSING CIRCUIT FOR WIRELESS ZONE SENSORS

BACKGROUND

Conventional air conditioning systems, often referred to as heating, ventilating and air conditioning (HVAC) systems for residential dwellings and other installations typically utilize one thermostat for controlling the temperature in the entire controlled space. For example, in a residential dwelling the thermostat is normally located centrally, such as in an interior hallway. However, various rooms throughout the dwelling, such as the kitchen, upper bedrooms in multi-story homes, or rooms in which a more appreciable heating or cooling load is occurring may not be properly controlled to produce a comfortable temperature for the occupants.

It is desirable to be able to control the temperature in various rooms or "zones" within a residential dwelling or other enclosed space. It is also desirable to be able to control the temperature at a particular area or in a particular room in a controlled interior space, and to control the HVAC system to provide an average temperature based on sensing temperatures at several locations within the controlled space, such as various rooms or zones within a residential dwelling unit.

In commercial structures, zoned HVAC systems are commonly employed for controlling multiple zones throughout the structure. A zoned system generally comprises multiple sensors disposed throughout the structure and operable to monitor temperature in corresponding zones. Upon sensing a temperature in a zone, a sensor may send a signal to a central control unit, which is operable to respond to the HVAC needs of the corresponding zone. While zoned systems have several known advantages, the overall cost installing and implementing such systems in a suitable infrastructure can be relatively expensive.

SUMMARY OF THE DISCLOSURE

In an embodiment, a heating, ventilating, and air conditioning (HVAC) system is provided for controlling climate conditions in a dwelling including a plurality of zones. The system includes a plurality of wireless thermostats disposed throughout the zones within the dwelling. Each thermostat is operable to control a climate condition in a corresponding zone by communicating signals through a network to a master control unit in communication therewith. The master control unit is operatively connected to a primary power source. The primary power source is operable to supply power to thermostats connected thereto, wherein thermostats powered by the primary power source operate in a high-powered mode. Each thermostat includes a secondary power source for supplying power when to operate in a low-power mode if a corresponding thermostat is not powered by the primary power source. Each thermostat operating in the high-power mode is configured to operate as a repeater operable to receive and route signals communicated through a wireless portion of the network.

In another embodiment, a wireless zone thermostat is provided for use in a HVAC system having multiple zone thermostats. The wireless zone thermostat includes a component configured for wireless communication. The component is operable to measure a parameter in a zone and transmit a signal indicative thereof to a processor. The processor is operable to communicate control signals based on the signal to a master control unit associated with the HVAC system. The wireless zone thermostat is operatively connected to an auxiliary power source operative to supply power thereto. Additionally, the wireless zone thermostat includes a power sensing circuit that is operable to determine whether the wireless zone thermostat is operatively connected to a primary power source that is operable to provide a steady supply of power to the wireless zone thermostat. When the power sensing circuit determines that the wireless zone thermostat is operatively connected to the primary power source, the wireless zone thermostat is powered by the primary power source and operates as a repeating thermostat in a high-powered mode. When the wireless zone thermostat is not powered by the primary power source, the wireless zone thermostat is powered by the auxiliary power source and operates as a non-repeating thermostat in a low-powered mode. When the zone thermostat is operating as a repeating thermostat in the high-power mode, the repeating thermostat is operable to receive and route signals communicated by other zone thermostats within the HCAC.

In yet another embodiment, a method is provided for operating a zone thermostat in a HVAC system having multiple zone thermostats. The method includes actively detecting whether a primary power source is supplying power to the zone thermostat, operating in a low-power mode upon detecting that the primary power source is not supplying power to the zone thermostat, and operating in a high-power mode upon detecting that the primary power source is supplying power to the zone thermostat. When operating in the low-power mode, the zone thermostat uses power supplied from a secondary power source. When operating in the high-power mode, the zone thermostat uses power supplied from a primary power source. In the low-power mode, the method includes selectively measuring parameters in a zone, and communicating wireless signals based on the measured parameters through a network to a master control unit. In the high-power mode, the method includes actively measuring the parameters in the zone, communicating signals based on the measured parameters through the network to the master control unit, and routing other signals received from other zone thermostats through the network.

Those skilled in the art will further appreciate the above-mentioned features and advantages of the disclosure together with other important aspects thereof upon reading the detailed description which follows in conjunction with the drawings.

BRIEF DESCRIPTION OF THE DRAWINGS

The drawings described herein are merely for purposes of illustration and are not intended to limit the scope of the present disclosure in any way.

Herein, like elements and features are marked throughout the disclosure and drawings with the same reference numerals, respectively.

DETAILED DESCRIPTION OF PREFERRED EMBODIMENTS

Figure 1:
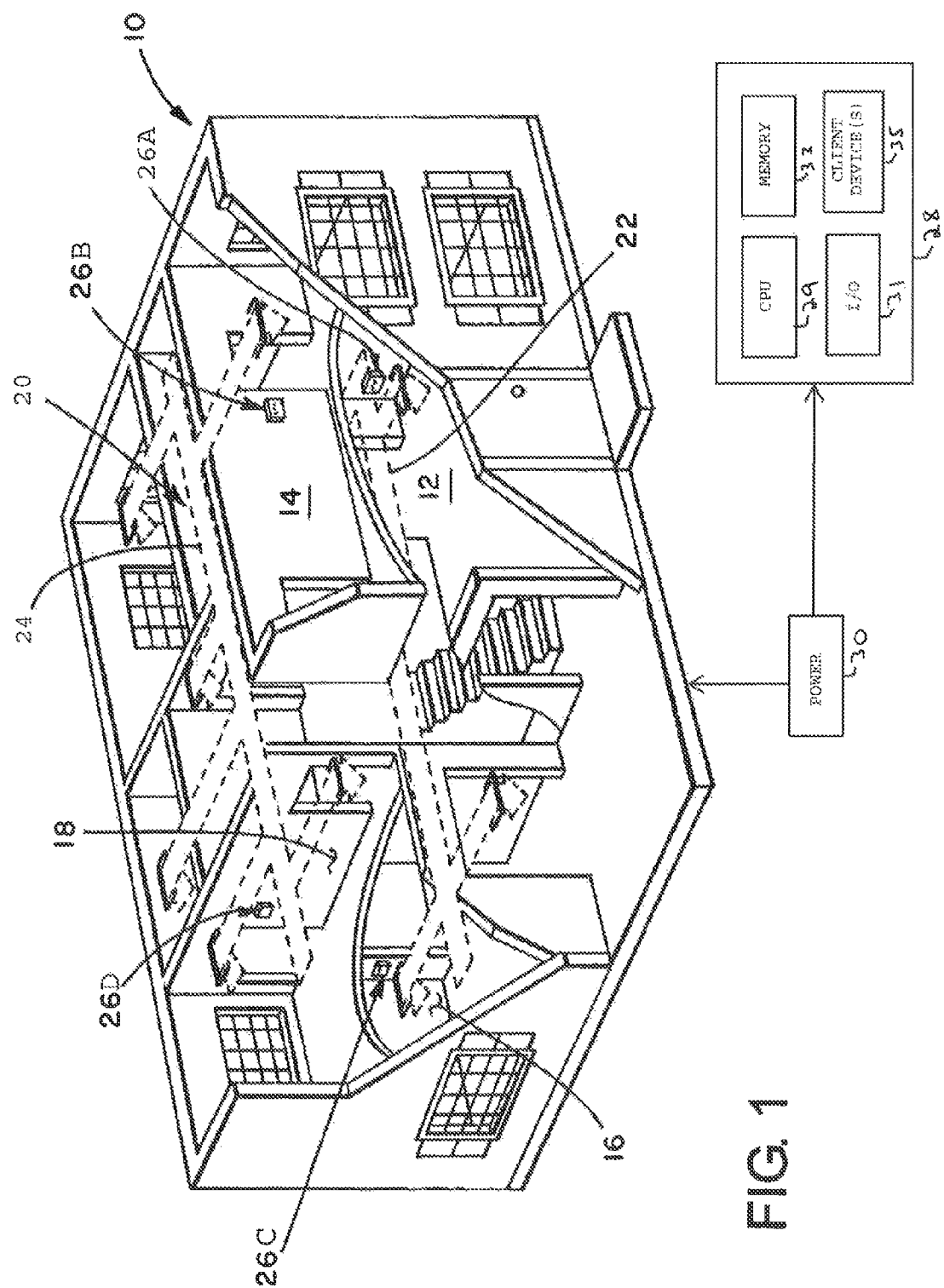
FIG. 1 is a schematic illustrating a two-story residential dwelling unit including an HVAC system having a plurality of thermostats operable to control climate conditions in a plurality of zones within the dwelling in accordance with the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of an HVAC system and method for controlling climate conditions using a plurality of wireless thermostats disposed throughout various portions of a multi-zone enclosure. In accordance with an embodiment of the present disclosure, the plurality of thermostats communicatively link to a master control unit operable to effect control of the HVAC system in response to receiving control signals from the plurality of wireless thermostats. Each thermostat is operable to communicate signals to the master control unit through a network, which may include a wired communication portion and a wireless communication portion. The system further includes a primary power source operatively connected to the master control unit and operable to provide a steady supply of power to thermostats operatively connected thereto. Thermostats operatively connected to the primary power source may operate in a high-power mode and may communicate with other devices through the wired portion of the network, or wirelessly through the wireless portion of the network.

Each thermostat includes a secondary power source operable to supply power for operating in a low-power mode. Thermostats may operate in the low-power mode using power supplied from their respective secondary power source when not operating from power supplied from the primary power source. In an implementation, a thermostat operates in the low-powered mode when a wired connection cannot be established with the primary power source. When operating in the low-power mode, thermostats may communicate wireless signals to the master control unit through the wireless portion of the network.

According to one aspect, each thermostat may include a switching circuit operatively connected to a power sensing circuit. The switching circuit is operable to configure the corresponding thermostat to operate in the low-power mode or the high-power mode in accordance with the active power supply connection, which the power sensing circuit is operable to detect. In an implementation, a switching circuit configures a corresponding thermostat to operate in the high-power mode only if the power sensing circuit determines that the primary power source is actively supplying power to the thermostat.

According to another aspect, a high-powered thermostat (i.e., a thermostat operating in the high-power mode) is operable to act as a repeater and extend the range of communication throughout the wireless portion of the network. For instance, high-powered thermostats may receive wireless signals originating from low-powered thermostats (i.e., thermostats operating in the low-power mode) and communicated throughout the wireless portion of the network. Upon receiving wireless signals, high-powered thermostats may amplify and subsequently route the amplified wireless signals to a device in accordance with the configuration of the network.

According to yet another aspect, the wireless portion of the network may include a cluster- or mesh-based topology in which one or more communication channels may be established for any given thermostat operable to communicate wireless signals. Additionally, wireless signals may "hop" or communicate through multiple high-powered thermostats along communication channels prior to reaching the intended destination (e.g., the master control unit). Further, high-powered thermostats may employ spread-spectrum techniques for communicating wireless signals throughout the network. The spread-spectrum techniques may include transmission schemes based on direct-sequence spread-spectrum (DSSS), frequency-hopping spread-spectrum (FHSS), adaptive frequency-hopping (AFH) spread-spectrum, time-hopping spread spectrum (THSS), chirp spread spectrum (CSS), or any combination thereof.

Referring now to FIG. 1, there is illustrated a cut-away of a multi-room, two-story conventional residential dwelling 10 divided into multiple interior zones or rooms 12, 14, 16, and 18. The dwelling 10 is air conditioned by a suitable system 20, herein referred to as an air conditioning or HVAC system, which is operable to heat and/or cool air supplied or re-circulated to a space. The system 20 distributes conditioned air via distribution ducts 22 and 24, shown somewhat schematically in FIG. 1. Although the system only points to the ducts 22 and 24, skilled artisans will appreciate that the system 20 may include various components commonly associated with HVAC systems such as, but not limited to, heaters, compressors, evaporators, humidifiers, etc. The system 20 includes at least one thermostat 26 for monitoring temperature in various zones of the dwelling 10. As shown in FIG. 1, for instance, thermostats 26A, 26B, 26C, and 26D may be disposed in rooms 12, 14, 16, and 18, respectively.

The temperatures within rooms 12, 14, 16 and 18 may vary somewhat due to heating or cooling loads imposed on the rooms. For example, if room 16 were a kitchen, at various times of the day the room may tend to become warmer due to cooking or other activities that generate heat. Additionally, movement of the sun or exposure to exterior air currents may tend to heat or cool rooms 12, 14, 16 and 18 unevenly. Of course, it would be desirable to be able to set the temperature in any one of the rooms 12, 14, 16 and 18 to achieve the level of comfort desired for that room. Alternatively, it may be desirable to maintain a relatively uniform temperature throughout the dwelling 10 by averaging the temperatures sensed by the thermostats 26A, 26B, 26C, and 26D and controlling the HVAC system 20 accordingly.

The HVAC system 20 may comprise a master control unit 28 operatively connected to each thermostat 26A, 26B, 26C, and 26D and operable to control various components associated with the HVAC system 20. As those familiar in the art will appreciate, the master control unit 28 may include or be operatively linked to various components commonly employed in HVAC control systems. For instance, the master control unit 28 may include a processor such as a microprocessor, microcontroller, or digital signal processor having a central processing unit (CPU) 29. The master control unit may also include input/output (I/O) circuits 31 and storage media 33 such as such as memory (e.g., ROM, RAM, EPROM) or storage devices (e.g., disk drives, CDs, DVDs), etc.

Furthermore, the master control unit 28 may include or be operatively connected to one or more client devices 35, which may have a touch-screen graphical user interface (GUI) for enabling users to interact with the master control unit 28. Of course, numerous other components associated with the master control unit 28 may be similarly employed, and therefore, necessarily fall within the purview of the present disclosure. Additionally, since the construction and operation of components associated with master control units of the sort depicted in FIG. 1 is well known and understood, discussion of the master control unit 28 will herein be limited to the extent necessary for enabling a proper understanding of the present disclosure.

As skilled artisans will readily appreciate, the master control unit 28 may be configured according to any suitable HVAC control unit that is operable to receive signals from each thermostat 26A, 26B, 26C, and 26D (e.g., wirelessly or via conductors) and control the HVAC system 20 accordingly. Skilled artisans will further appreciate that determining whether modification of an HVAC setting is necessary may be accomplished according to various techniques and algorithms. Generally, determining whether to adjust an HVAC setting may be based on a comparison between a sensed parameter (e.g., temperature or humidity) in a zone and a corresponding setpoint, which may be defined by a user or determined according to any suitable algorithm. Machine-learning algorithms, for example, may be configured to calculate a setpoint based on a variety of factors such as indoor and/or outdoor temperatures, historical temperature averages, user preferences, etc.

In an embodiment, the master control unit 28 includes or is operatively connected to a primary power source 30, which is operable to supply a steady power output to a device associated with the HVAC system 20 such as thermostats 26A, 26B, 26C, and 26D. A transformer, for example, may be employed for supplying voltage to components (e.g., thermostats 26A, 26B, 26C, and 26D) via a controller operatively linked thereto. The primary power source 30 may be any suitable power source such as, but not limited to, a fixed or variable voltage circuit operable to supply electrical power in the form of alternating current (AC) or direct current (DC). In an implementation for use with a residential dwelling 10, for example, the primary power source 30 may comprise a 24-volt power source. As those of ordinary skill in the art will appreciate, each thermostat 26A, 26B, 26C, and 26D may be electrically connected (e.g., hard wired) to the master control unit 28 via a 24-volt power line or a common line associated with the 24-volt power source 30. Further, a thermostat 26 may connect to a primary power source 30 and receive power therefrom according to various "power-stealing" techniques. As described later, a thermostat 26 may include an AC adapter and connect to a primary power source 30 such as an electrical system associated with the dwelling 10 simply by inserting the AC adapter into an outlet within the dwelling 10.

Figure 2:
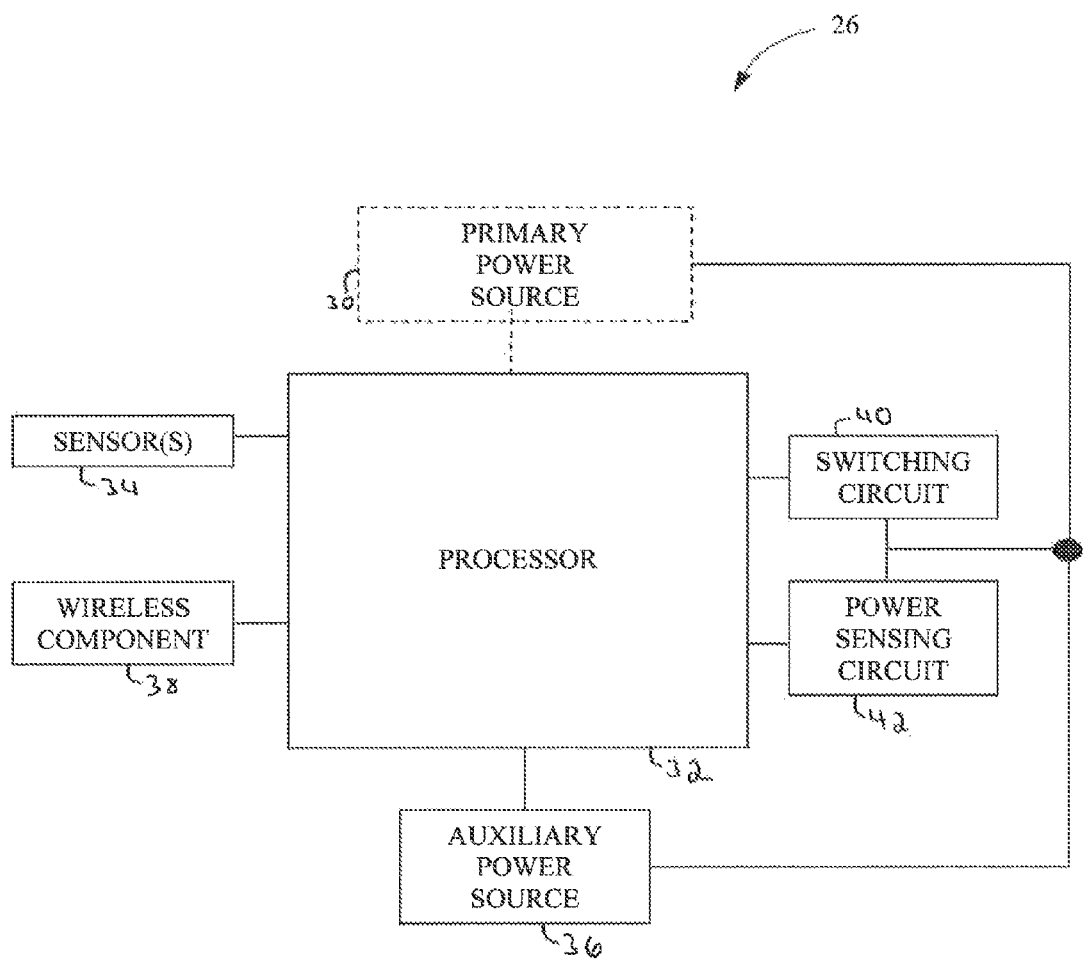
FIG. 2 is a block diagram illustrating a thermostat corresponding to the plurality of thermostats in accordance with an embodiment of the present disclosure.

Referring now to FIG. 2, a block diagram of a thermostat 26 according to an embodiment of the present disclosure is shown. While the thermostat 26 generally corresponds to the thermostats 26A, 26B, 26C, and 26D depicted in FIG. 1 (and FIG. 3, described later), those of ordinary skill in the art will readily appreciate that one or more thermostats 26A, 26B, 26C, and/or 26D may comprise a variety of additional features that fall within the scope of the present disclosure. Briefly, for example, thermostats 26 may include input/output (I/O) circuitry for connecting to various devices within a network. A thermostat 26 may be digital and/or programmable, and may include may include suitable memory for storing data. A thermostat 26 may also include a GUI associated with a touch-screen or keypad for allowing users to control various HVAC settings and aspects of the thermostat 26.

In an embodiment, the thermostat 26 includes a suitable processor 32 such as a microprocessor, microcontroller, or digital signal processor, for example, which may have a CPU. The processor 32 is operatively connected to one more sensors 34 operable to sense various characteristics in a zone. Although the sensors 34 described herein will generally refer to temperature sensors, skilled artisans will appreciate that the sensors 34 may include various sensors for use within a dwelling 10. For instance, sensors 34 may include, but are not limited to, humidity sensors, pressures sensors, carbon dioxide/monoxide sensors, smoke detector sensors, or any combination thereof.

Moreover, while the sensor 34 is described herein as being incorporated with the thermostat 26, those of ordinary skill in the art will appreciate that the sensor 34 may be provided as a separate component. In this case, the sensor 34 may include a suitable power supply, processor(s), CPU(s), I/O circuit(s), storage media, etc. Additionally, such a sensor 34 may be a wireless sensor including a radio transceiver and/or radio frequency (RF) circuitry for communicating wirelessly with the thermostat 26. Thus, a plurality of wireless sensors 34 communicatively linked to one or more thermostats (e.g., thermostats 26A, 2B, 26C, and/or 26D) may be separately disposed within various locations throughout the dwelling 10 (e.g., in a hallway, bedroom, basement, etc.). Similarly, sensors 34 physically unattached to a thermostat 26 may be configured to communicate directly with the master control unit 28, a thermostat 26 configured as a master thermostat, or any combination of devices associated with the HVAC system 20.

For purposes of convenience, the sensors 34 will herein be described as being incorporated with a corresponding thermostat 26 so as to form a wireless thermostat 26 operable to sense one or more parameters in a zone. Each sensor 34 is operable to measure a characteristic such as temperature in a corresponding zone (e.g., room 12, 14, 16, or 18), and may communicate a signal indicative of the sensed temperature to the thermostat 26, or directly to the master control unit 28. In one implementation, the sensor 34 communicates the signal to the processor 32 associated with the thermostat 26. The processor 32 is operable to process the signal, and based on the processed signal, may communicate a signal to the master control unit 28. If necessary, the master control unit 28 may responsively adjust the HVAC conditions of the corresponding zone.

The thermostat 26 may include or be operatively connected to an auxiliary power source 36 operable to provide power to the thermostat 26. As such, the thermostat 26 may draw power from either the auxiliary power source 36 or the primary power source 30. As those of ordinary skill in the art will readily appreciate, the auxiliary power source 36 may include any suitable source operable to supply power to the thermostat 26, such as, but not limited to, one or more batteries, solar cells, fuel cells, etc.

The thermostat 26 may further include a wireless component 38 for enabling the thermostat 26 to communicate with devices such as the master control unit 28 through a wireless network associated with the HVAC system 20. As such, if the thermostat 26 is operatively connected to the primary power source 30, the thermostat 26 may communicate with the master control unit 28 through either wired transmissions or wirelessly using the wirelessly component 38. However, if the thermostat 26 becomes disconnected or stops receiving power from the primary power source 30, the thermostat 26 may operate on power supplied from the auxiliary power source 36. In such instances, the thermostat 26 may be incapable of communicating via wired data transmissions such as through a power line. If it cannot, the thermostat 26 may instead utilize the wireless component 38 to communicate wirelessly with the master control unit 28. A thermostat 26 may similarly utilize the wireless component 38 to communicate wirelessly in instances where a wired connection is impractical or cannot be established. Accordingly, the thermostat 26 may communicate within the system 20 through wired data transmissions and/or wirelessly through a wireless network.

Skilled artisans will readily appreciate that the wireless component 38 may include various circuitry and electrical elements for enabling the thermostat 26 to communicate within a wireless network in accordance with any suitable type of wireless communication such as, but not limited to, infrared communication, ultrasonic communication, RF communication, etc. For instance, the wireless component 38 may include circuitry having an antenna arrangement and/or a transceiver for transmitting and receiving wireless signals to and from devices throughout a wireless network. Such network devices may include any devices in a wireless network associated with the system 20, such as, but not limited to, a transformer and/or main controller (e.g., master control unit 28), thermostats (e.g., thermostats 26A, 26B, 26C, and 26D), relays, routers, sensors, client devices, etc.

According to an embodiment of the present disclosure, the processor 32 is operatively connected to a switching circuit 40 for configuring the thermostat 26 to operate in either a low-power mode or a high-power mode. The switching circuit 40 is communicatively linked to a power sensing circuit 42 operable to determine whether the thermostat 26 is connected to and/or being powered by the primary power source 30 or the auxiliary power source 36. While the switching circuit 40 and the power sensing circuit 42 are shown in FIG. 2 as being separate circuits, skilled artisans will appreciate that the switching circuit 40 and the power sensing circuit 42 may be integrated as a single circuit that is operatively connected to the processor 32.

In an embodiment, the power sensing circuit 42 may be configured to continuously monitor the power supply connection in order to determine which power source 30 or 36 is supplying power to the thermostat 26 at any given time. Alternatively, the power sensing circuit 42 may be configured to detect the power supply connection according to a predetermined schedule (e.g., at periodic intervals). Upon identifying the active power source 30 or 36, the power sensing circuit 42 may transmit, either automatically or according to a predetermined time, a signal indicative of the identified power source 30 or 36 to the processor 32. The power sensing circuit 42 may also transmit a signal identifying the power source 30 or 36 upon receiving a request command from the processor 32.

If the processor 32 receives a signal from the power sensing circuit 42 indicating that the auxiliary power source 36 is supplying power to the thermostat 26, then the processor 32 may instruct the switching circuit 40 to configure the thermostat 26 to operate in a low-power mode. In the low-power mode, the functionality of the thermostat 26 is limited to reduce power consumption and extend the operating life of the auxiliary power source 36. If the auxiliary power source 36 includes a battery, for example, the thermostat 26 may be configured to perform functions that do not require significant energy such that the battery 36 may be utilized as a suitable source of power for a relatively long time (e.g., two or three years, or shorter/longer depending on type and quantity). Therefore, the thermostat 26 may be limited to perform basic sensing functions and to communicate sensed parameters of a corresponding zone to the master control unit 28, which is operable to control the HVAC system 20 accordingly. Similarly, since configuring a thermostat 26 to sense parameters actively or continuously requires a constant power output, a thermostat 26 operating in the low-power mode may instead be configured to sense parameters periodically or upon request, to further reduce power consumption.

If the processor 32 receives a signal from the power sensing circuit 42 indicating that the primary power source 30 is supplying power to the thermostat 26, then the processor 32 may instruct the switching circuit 40 to configure the thermostat 26 to operate in a high-power mode. In the high-power mode, the thermostat 26 is operable to perform additional functions that require increased power, such as certain wireless communication functions that the thermostat 26 may be incapable of performing efficiently when powered by the auxiliary power source 36. As described in further detail below, a thermostat 26 operating in the high-power mode is configured to act as a repeater (also commonly referred to as a relay or router) for other devices in a network associated with the system 20.

Figure 3:
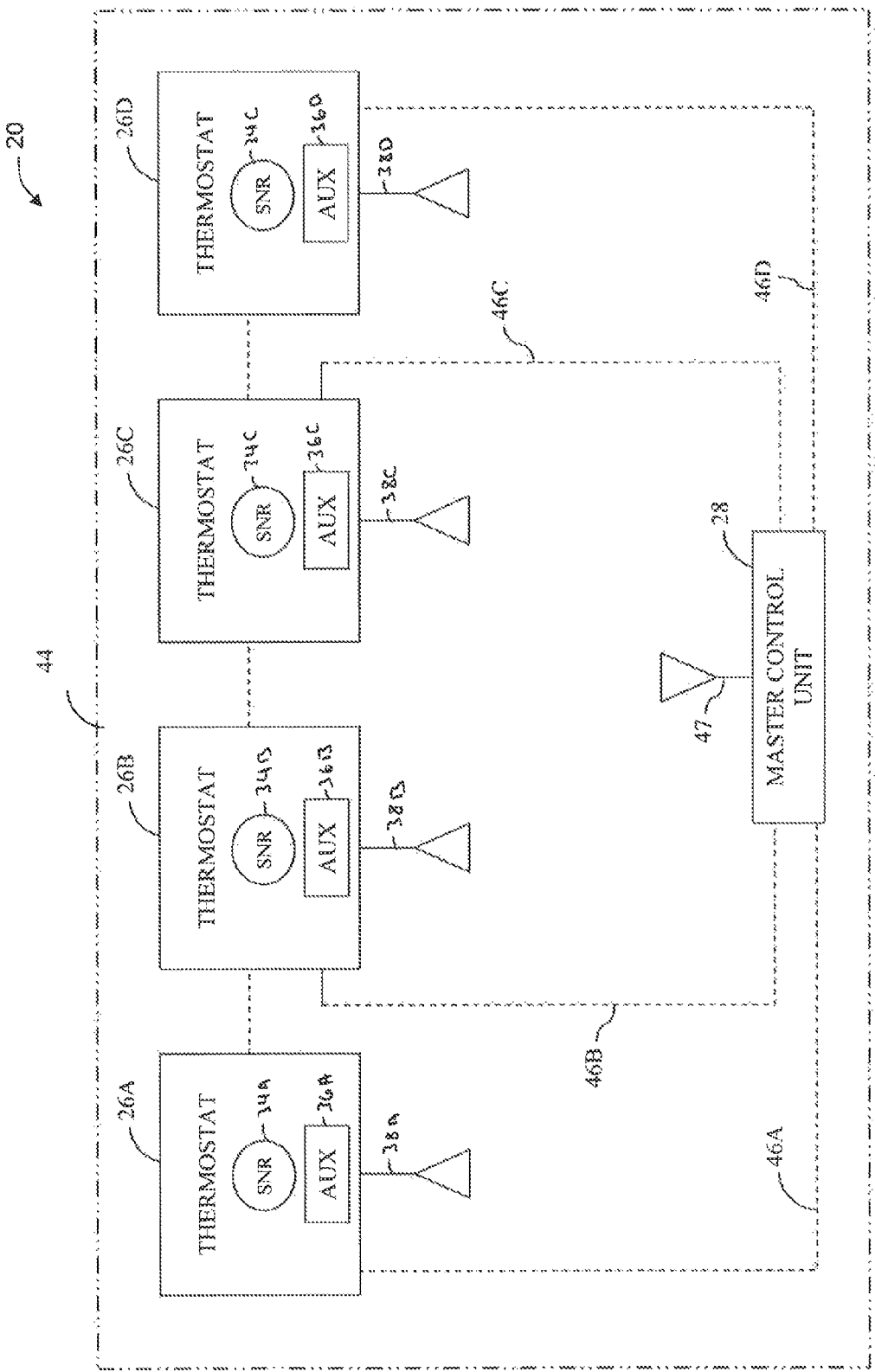
FIG. 3 is a schematic illustrating the HVAC system, where the plurality of thermostats are communicatively linked to a master control unit through a network.

Referring briefly to FIG. 3, there is shown a block diagram illustrating the HVAC system 20 and thermostats 26A, 26B, 26C, and 26D depicted in FIG. 1. While the HVAC system 20 shown in FIGS. 1 and 3 is described herein with respect to a residential dwelling 10, skilled artisans will readily appreciate that the HVAC system 20 may be implemented in any suitable structure (e.g., office buildings, complexes, townhomes, etc.). Additionally, while four thermostats 26A, 26B, 26C, and 26D are shown in FIGS. 1 and 3, it is to be understood that more or less thermostats 26 may be provided.

The HVAC system 20 includes a communication network 44 through which various components of the system 20 may interact. In an embodiment, the network 44 may comprise an integrated network 44 including a wired distribution network and a wireless sensor network (WSN) such as an ad-hoc network. For instance, thermostats 26A, 26B, 26C, and 26D may wirelessly connect to the master control unit 28 using wireless components 38A, 38B, 38C, and 38D, respectively. Thus, the thermostats 26A, 26B, 26C, and 26D depicted in FIGS. 1 and 3 may be viewed as nodes that form part of the network 44. Analogous to the thermostats 26, the master control unit 28 may include any suitable wireless component 47 for communicating wirelessly with various devices throughout the network 44.

The wireless network 44 may employ various types of networks, protocols, or technologies. For instance, the wireless communication portion of the network 44 may be based on Code Division Multiple Access (CDMA), Time Division Multiple Access (TDMA), Frequency Division Multiple Access (FDMA), Orthogonal Frequency Division Multiplexing (OFDM), or any suitable multiple access scheme. Additionally, the wireless protocol of the network 44 may be based on any suitable protocol, such as, but not limited to, conventional radio frequency (RF), Bluetooth®, ZigBee®, Wi-Fi™, and/or IEEE® protocols.

In addition, thermostats 26A, 26B, 26C, and 26D may connect to the master control unit 28 electrically through a wired distribution portion of the network 44 by way of wires 46A, 46B, 46C, and 46D, respectively. As previously discussed, wires 46A, 46B, 46C, and 46D may comprise power lines operatively connected to a primary power source 30 associated with the master control unit 28. Accordingly, the thermostats 26A, 26B, 26C, and 26D may receive a steady supply of power from the primary power source 30 when connected within the system 20 via wires 46A, 46B, 46C, and 46D, respectively.

A variety of factors may influence whether a thermostat 26A, 26B, 26C, and 26D is connected wirelessly using its wireless component 38A, 38B, 38C, and 38D or via wires 46A, 46B, 46C, and 46D, respectively. For instance, there may be situations in which a thermostat (e.g., thermostat 26A) is disposed in an area within the dwelling 10 where it would be too difficult or impractical to establish a wired connection (e.g., via wire 46A) with the primary power source 30. In such situations, the thermostat 26 may run off power supplied from its auxiliary power source (e.g., source 36A) and operate in the low-power mode.

As previously discussed, thermostats 26 operating in the low- and high-power modes may communicate via wireless signals through communication paths within the wireless network 44. However, there may be situations where a thermostat 26 is disposed too far such that the thermostat 26 cannot sufficiently communicate wirelessly with the master control unit 28. There may also be instances where various factors (e.g., obstructions, electrical noise and interference, attenuation, etc.) hinder or prevent a particular thermostat 26 from communicating wireless signals of a sufficient quality that can be received and processed by the master control unit 28, and vise-versa. In such situations, thermostats 26 operating in the high-power mode may be employed as repeaters to facilitate wireless communications through the wireless network 44 between one or more thermostats 26 (e.g., thermostats 26A, 26B, 26C, and/or 26D) and the master control unit 28.

As described herein, a thermostat 26 operating on power supplied from the primary power source 30 in the high-power mode may be referred to as a "high-powered thermostat," or a "repeating thermostat." Similarly, a thermostat 26 operating on power supplied from its auxiliary power source 36 in the low-power mode may herein be referred to as a "low-powered thermostat" or a "non-repeating thermostat." Moreover, a "high-powered thermostat" is to be understood as a thermostat 26 receiving a steady supply of power that generally does not increase or decrease over time. In contrast, a "low-powered thermostat" is to be understood as a thermostat 26 receiving a supply of power that diminishes over time. As discussed further below, a low-powered thermostat 26 may be configured with less sensing and/or wireless communication capabilities than a high-powered thermostat 26.

In an embodiment, thermostats 26 operating as repeaters are operable to receive wireless signals from low- and high-powered thermostats 26 within the network and responsively forward the signals to a designated recipient such as another thermostat 26A, 26B, 26C, or 26D or the master control unit 28. As skilled artisans will appreciate, a high-powered thermostat 26 may communicate data obtained from wireless signals to designated recipients either wirelessly or via wired data transmissions. High-powered thermostats 26 may further be operable to measure the quality of received signals prior to routing the signals to designated recipients. For instance, if the signal quality of a received signal is below a predetermined threshold, a high-powered thermostat 26 may amplify the signal prior to repeating it.

According to one implementation, a cluster- or tree-based topology is employed in which one or more other thermostats 26A, 26B, 26C, and/or 26D may be utilized to route signals communicated along paths between network devices such as the master control unit 28 and other thermostats 26A, 26B, 26C, and/or 26D. Similarly, the wireless network 46 may employ a mesh-based topology where each thermostat 26 may include multiple communications paths. As such, if a thermostat 26 along a path cannot be utilized to route signals, signals may automatically be rerouted through a different communication path using one or more other thermostats 26A, 26B, 26C, and/or 26D.

In an embodiment, the network 44 employs a "multi-hop" or mesh-based topology for extending the range of the wireless network 46. For instance, a signal communicated through the network 44 may "hop" or be routed from one thermostat (e.g., thermostat 26A) to another (e.g., thermostat 26C) until the signal reaches its intended destination (e.g., master control unit 28). Additionally, the network 44 may be configured to accommodate continuous communication connections between devices, including continuous reconfigurations around broken or blocked communications paths within the network 44 (e.g., based on availability of repeating thermostats 26 and signal strength of corresponding communications channels). In one aspect, the wireless network 44 may automatically reroute signals within communication paths when thermostats 26 acting as repeaters in such paths stop receiving power from the primary power source 30. Accordingly, the network 44 is self-configurable in that the determination as to which repeating thermostats 26A, 26B, 26C, 26D should receive and route signals may be made dynamically.

Skilled artisans will readily appreciate that the wireless network 44 may be configured such that a repeating thermostat 26 is operable to route signals along a particular communication channel based on various information regarding the channel. Such information may include, but is not limited to, signal to noise ratio (SNR), received signal strength (RSS) or bit error rate (BER), etc. A particular channel may also be selected based on various statistics for estimating the corresponding quality, such as, but not limited to, frame error rate, ACK (Acknowledge Character), the number of successful receipts, throughputs, or any combination thereof.

Furthermore, a repeating thermostat 26 may be configured to attach data to signals routed to other devices. A repeating thermostat 26 may receive signals that comprise various data in the form of data packets, which may include a preamble, an address or identification (ID) code, data, etc. Therefore, a repeating thermostat 26 may attach further data to these packets prior to forwarding the signals, where the network 44 may use the attached data to improve the routing configurations. If a repeating thermostat 26 has an address or ID, for example, the repeating thermostat 26 may attach its corresponding address or ID to packets when forwarding signals to other devices. Furthermore, skilled artisans will appreciate that repeating thermostats 26 may communicate signals using various spread-spectrum techniques. Such techniques may include, but are not limited to, direct-sequence spread-spectrum (DSSS), frequency-hopping spread-spectrum (FHSS), adaptive frequency-hopping (AFH) spread-spectrum, time-hopping spread spectrum (THSS), chirp spread spectrum (CSS), etc.

In an embodiment, either the low-power mode or the high-power mode may be designated as a default mode for which the thermostat 26 will operate. For instance, the switching circuit 40 may include a switching element such as an on/off switch, where functions that the thermostat 26 can only perform when operating in the high-power mode are disabled when the switch is "off" and are enabled when the switch is "on." Thus, if the designated default setting for the on/off switch is "off," the thermostat 26 operates in the low-power mode by default. However, if the power sensing circuit 42 determines that the thermostat 26 is receiving power from the primary power source 30, the processor 32 may instruct the switching circuit 40 to turn the switch "on," thereby enabling the functions that the thermostat 26 is operable to perform in the high-power mode. Of course, the switching circuit 40 may be alternatively configured such that the thermostat 26 operates in the high-power mode by default. Further, those familiar in the art will appreciate that the switching circuit 40 may comprise any suitable circuitry and electrical devices for configuring a thermostat 26 to operate in the low- and high-power modes, such as switching diodes, semiconductor-controlled devices and bidirectional switching devices including any variety of transistors, etc.

In another embodiment, a thermostat 26 may be configured to automatically revert to a designated default power mode upon becoming disconnected from a power source 30 or 36 that supplies power to the thermostat 26 when operating in the non-designated power mode. Similarly, a thermostat 26 operating in the designated default power mode may be configured to automatically operate in the non-designated power mode upon being connected to an active power source 30 or 36 that supplies power during the non-designated mode of operation.

In yet another embodiment, the thermostat 26 may include a small transformer such as a power adapter or wall wart that has an attached connector such as an electric plug. The thermostat 26 may be electrically connected to a primary power source 30 by inserting the plug into an outlet such as a wall socket within the dwelling 10. If the thermostat 26 is either not plugged into the socket, or not receiving power from the primary power source 30 when plugged in (e.g., due to an interruption such as a fuse), the thermostat 26 is powered by an auxiliary power source 36 such as a battery. In such cases, the thermostat 26 operates in a low-power mode to conserve energy. If the thermostat 26 is both, plugged into the socket and receiving power from the primary power source 30, the thermostat 26 operates in a high-power mode where it can perform high-powered functions. If the thermostat 26 is subsequently unplugged or otherwise stops receiving power from the primary power source 30, the thermostat 26 may automatically revert to the low-power mode and operate on power supplied from the auxiliary power source 36.

As previously discussed, there may be instances where it would be more practical for a thermostat 26 to operate on power from its auxiliary power source 36, where the thermostat 26 may communicate wirelessly using its wireless component 38. However, since wireless devices commonly demand significant power to support their wireless capabilities, a relatively large auxiliary power source 36 may be required to accommodate the power requirements of a wireless, low-powered thermostat 26. While a relatively small auxiliary power source 36 may be provided instead, this may not be a viable alternative since an auxiliary power source 36 such as small-sized batteries may need to be frequently recharged or replaced. Thus, the wireless operations of the low-powered thermostat 26 may be reduced to preserve energy.

When operating in the low-power mode, the thermostat 26 may generally be configured to perform basic functions necessary for controlling the HVAC conditions in the corresponding room or zone, yet without consuming significant power from the auxiliary power source 36. For instance, when thermostats 26A, 26B, 26C, and 26D in FIG. 1 operate in the low-power mode, each thermostat 26 is at least operable to detect temperatures in the rooms 12, 14, 16, and 18, respectively. Thermostats 26A, 26B, 26C, and 26D are further operable to wirelessly communicate signals based on the sensed temperatures to the master control unit 28, which may respond to the HVAC needs of the corresponding rooms 12, 14, 16, and 18 accordingly.

While a thermostat 26 operating in the low-power mode may sense temperatures and communicate signals indicative thereof to the master control unit 28, to do so actively may unnecessarily drain the power of its respective auxiliary power source 36. Thus, a thermostat 26 operating in the low-power mode may be configured to enter a standby or sleeping mode in which the thermostat 26 "wakes up" periodically to sense temperatures and transmit signal to the master control unit 28. In one aspect, the thermostat 26 may be configured to only transmit signals (e.g., command or control signals) to the master control unit 28 if the processor 32 determines that a climate condition may require adjustment. Alternatively, the thermostat 26 may be configured to automatically transmit signals indicative of sensed parameters if doing so would consume less energy than configuring the processor to determine whether a signal should be sent.

In an embodiment, a low-powered thermostat 26 that enters a standby or sleeping mode during low-power operation may be configured to periodically wake up for a predetermined duration in which it may receive signals transmitted from other devices within the network 44. For instance, in situations where low-powered thermostats 26 may expect to receive signals from other devices such as the master control unit 32, a low-powered thermostat 26 may wake up to receive wireless signals transmitted from such devices (e.g., either directly or via repeating thermostats 26). Similarly, in implementations where a thermostat 26 (e.g., thermostat 26A) and a corresponding sensor 34 (e.g., sensor 34A) are detached and wirelessly linked to one another, a low-powered thermostat 26 may wake up at periodic intervals to receive parameter signals from the corresponding sensor 34.

As previously discussed, a thermostat 26 may include any suitable auxiliary power source 36 for supplying power thereto. In an embodiment, the auxiliary power source 36 comprises a source of power that may be refueled, recharged, or otherwise reenergized to provide additional power (e.g., a rechargeable battery). When the thermostat 26 is operatively connected to the primary power source 30 and operating in the high-power mode, power supplied from the primary source 30 may be utilized to reenergized the auxiliary power source 36. For instance, if the remaining power that the auxiliary power source 26 is operable to supply falls below a predetermined threshold, the primary power source 30 may be configured to energize the auxiliary power source 36 when the thermostat 26 is operating in the high-power mode.

In an embodiment, any one of the thermostats 26A, 26B, 26C, 36D may be directly connected or hardwired to the master control unit 28. Thus, the thermostat 26 may be implemented as a master thermostat 26 operable to control other thermostats 26A, 26B, 26C, and 26D in accordance with a master-slave type relationship.

Figure 4:
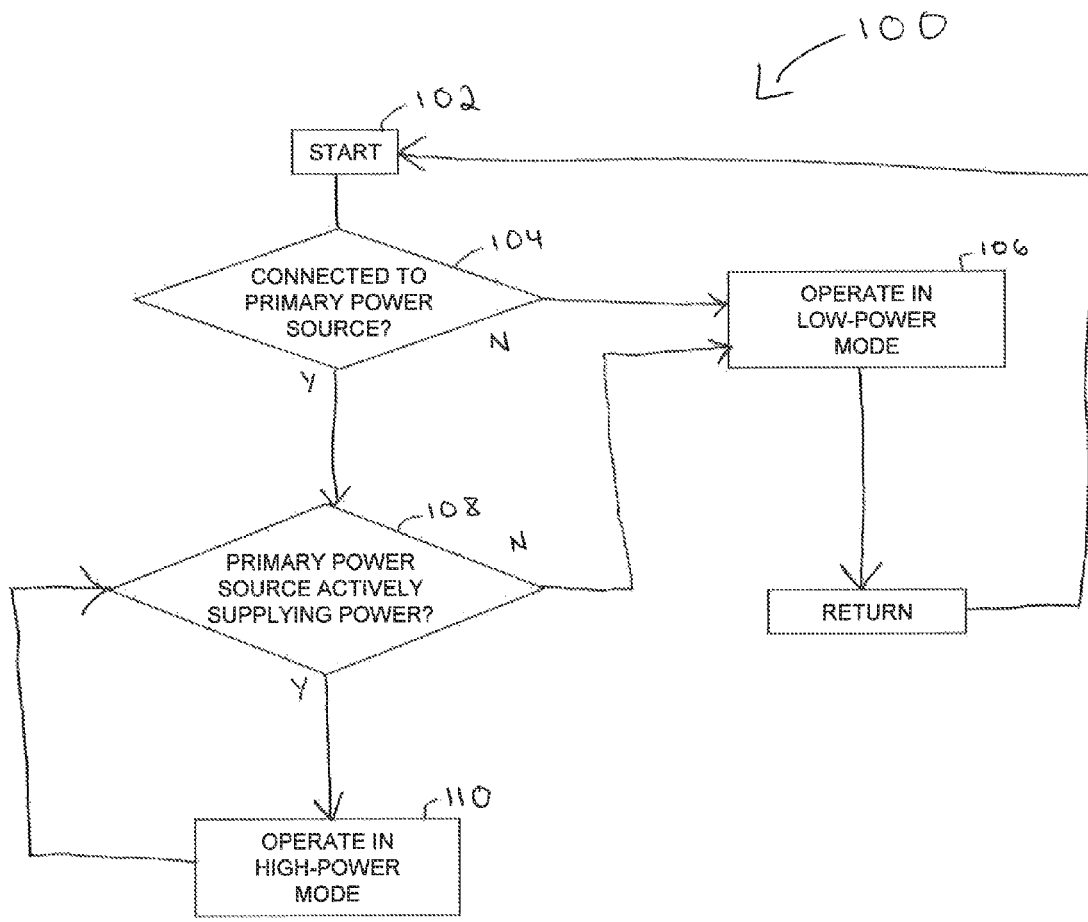
FIG. 4 is a flowchart illustrating a method of operating a thermostat according to an embodiment of the present disclosure.

Referring now to FIG. 4, a method 100 for operating a thermostat 26 in accordance with the present disclosure will now be described. As those familiar in the art will appreciate, the method may employ any of the features previously described herein. The method 100 begins in block 102. In block 104, the method 100 actively detects whether the primary power source 30 is connected to the thermostat 26. If the primary power source 30 is not connected to the thermostat 26, the method continues to block 106. In block 106, the thermostat 26 is powered by the secondary power source 36 and operates in a low-power mode.

Since the secondary power source 36 is not operable to provide an unlimited or constant supply of power so long as it remains connected to the thermostat 26, the method 100 is configured to continuously detect whether the thermostat 26 is connected to the primary power source 30 when operating in the low-power mode. If the thermostat 26 remains unconnected to the primary power source 30 while operating in the low-power mode, the thermostat 26 will continue running in the low-power mode for the duration that the secondary power source 36 is operable to supply power. When the remaining power of the secondary power source 36 has been entirely consumed by the thermostat 26, the secondary power source 36 may be recharged or replaced.

If the primary power source 30 is connected to the thermostat 26, the method 100 proceeds to block 108. As mentioned above, there may be instances where the primary power source 30 is connected to the thermostat 26 but may not be supplying power to the thermostat 26 (e.g., due to temporary power outages). Therefore, in block 108, the method 100 determines whether the primary power source 30 is supplying power to the thermostat 26. If not, the method returns to in block 106, where the thermostat 26 is configured to operate in the low-power mode using power supplied from the secondary power source 36. If the primary power source 30 is supplying power, the thermostat 26 is configured to operate in a high-power mode in block 110, in which case the secondary power source 36 may be automatically disabled to preserve power for potential future use. The thermostat 26 will continuously run in the high-power mode in block 110 so long as the primary power source 30 is supplying power thereto. In the event that the primary power source 30 stops supplying power to the thermostat 26, the method 100 configures the thermostat 26 to operate in the low power mode in block 106.

As those familiar in the art will appreciate, a thermostat 26 according to the present disclosure may connect to one another through a wireless network that does not require a preexisting infrastructure, such as separate routers in wired networks or wireless access points (WAPs) in managed wireless networks. Instead, each thermostat 26 acting as a repeater may participate in the routing of communication by forwarding or repeating signals to other thermostats 26. Similarly, an HVAC system 20 according to the present disclosure may include a plurality of thermostats that may be easily retrofitted into an existing building or residential dwelling without hard wiring between each of the thermostats and a master thermostat or between each of the thermostats and an HVAC control unit.

While the present disclosure has been described herein with respect to an existing dwelling 10, those of ordinary skill in the art will readily appreciate that the techniques disclosed herein may be similarly employed in designing an HVAC system for a dwelling or structure. For instance, an installer may test signals throughout various areas of a dwelling to determine locations where it would be desirable to wire thermostats 26 to act as repeaters. Accordingly, an installer may design a dwelling such that only a certain number of thermostats will require wiring to ensure reliable communication between each thermostat throughout the dwelling, irrespective of where other thermostats (e.g., wireless thermostats) are located.

In addition, skilled artisans will appreciate that the thermostats 26 and/or wireless sensors 34 described herein may be communicatively linked to one or more components of the HVAC system 20, such as, but not limited to, an air handler, a furnace, an air conditioner, a refrigeration unit, and/or a heat pump. Similarly, while the present application has been described herein with reference to an HVAC system 20, it is to be understood that the scope of the present disclosure is not so limited, as those of ordinary skill in the art will appreciate that the wireless thermostat 26 may be implemented in any suitable system or network. Similarly, the techniques disclosed herein regarding repeating and non-repeating thermostats 26 may similarly apply to numerous types of wireless devices, and therefore, the disclosed disclosure should not be construed as being limited to thermostats. By way of example, the disclosed techniques may apply to motion sensors in security systems, smoke/fire sensors in emergency systems, light sensors in lighting systems, etc.

Even further, it is to be understood that the examples described herein with respect to thermostats 26A, 26B, 26C, and 26D are merely for purposes of illustration. Those of ordinary skill in the art shall appreciate that thermostats 26 according to the present disclosure may apply in structures having any combination of zones, shapes, and sizes. For instance, in a multi-storied structure having multiple zones within each floor, it may be desirable to configure thermostats 26 in certain zones to operate wirelessly in the low-powered mode. In situations where a low-powered thermostat 26 may be incapable of transmitting signals to a designated recipient effectively (e.g., without the use of a routing device), thermostats 26 configured as repeaters may be employed. As such, the network 44 may establish multiple communication paths for each low-powered thermostat using repeating thermostats 26, wherein each path for a given low-powered thermostat 26 may include any combination of repeating thermostats 26 operable to receive and route signals accordingly.

Although numerous embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, various elements or components may be combined or integrated in another system or certain features may be omitted, or not implemented.

Further, it is to be understood that the processes or steps described herein are not to be construed as necessarily requiring their performance in the particular order discussed or illustrated. It is also to be understood that each process or step can be repeated more than once and that additional or alternative processes or steps may be employed and still be within the scope of the present disclosure. As those skilled in the art will appreciate, various substitutions and modifications may be made to the systems and methods of the disclosure without departing from the scope and spirit of the appended claims.

What is claimed is:

1. A heating, ventilating, and air conditioning (HVAC) system for controlling climate conditions in a dwelling including a plurality of zones, the system comprising:
    a plurality of wireless thermostats disposed throughout the plurality of zones within the dwelling, each thermostat being operable to control a climate condition in a corresponding zone, the corresponding zone being selected from the plurality of zones;

a master control unit communicatively linked to the plurality of wireless thermostats and operable to receive a plurality of signals therefrom, the plurality of signals being communicated through a network associated with the system; and a primary power source linked to the master control unit and operable to supply power to each thermostat operatively connected thereto, wherein each thermostat powered by the primary power source is operable to operate in a high-power mode;

wherein each thermostat includes a corresponding secondary power source operable to supply power for operating in a low-power mode;

wherein each thermostat not powered by the primary power source in the high-power mode is powered by the corresponding secondary power source in the low-power mode;

wherein each thermostat is selectively operable between a repeating thermostat and a non-repeating thermostat;

wherein each thermostat operating in the high-power mode operates as a repeating thermostat to receive and route signals received from other thermostats operating in either the high-power mode or the low-power mode through a wireless portion of the network, the signals being selected from the plurality of signals;

wherein each thermostat operating in the low-power mode operates as a non-repeating thermostat to limitedly perform sensing functions and wirelessly transmit sensed parameters of at least one corresponding zone to an exclusion of control parameters of other non-corresponding zones;

wherein a thermostat operating in the high-power mode as a repeating thermostat automatically switches to operating in the low-power mode as a non-repeating thermostat in response to a switch from the primary power source providing power to the thermostat to the secondary power source providing power to the thermostat; and wherein a thermostat operating in the low-power mode as a non-repeating thermostat automatically reverts to operating in the high-power mode as a repeating thermostat in response to a switch from the secondary power source providing power to the thermostat to the primary power source providing power to the thermostat.

2. The system of claim 1, wherein each thermostat includes a corresponding power sensing circuit operable to determine whether power is being supplied from the primary power source or the corresponding secondary power source, respectively.

3. The system of claim 1, wherein each thermostat operating in the low-power mode is operable to selectively communicate signals wirelessly through the wireless portion of the network to at least one thermostat operating in the high-power mode or the master control unit.

4. The system of claim 3, wherein each thermostat operating in the low-power mode ignores signals communicated by other thermostats throughout the wireless portion of the network.

5. The system of claim 1, wherein each thermostat operating in the high-power mode is operable to route received signals to one of the master control unit or an additional thermostat operating in the high-power mode.

6. The system of claim 5, wherein at least one of the received signals is a wireless signal originating from a thermostat operating in the low-power mode.

7. The system of claim 6, wherein each thermostat operating in the high-power mode is operable to route wireless signals using spread-spectrum transmissions.

8. The system of claim 7, wherein each thermostat operating in the high-power mode is operable to route wireless signals using spread-spectrum transmissions based on at least one spread-spectrum transmission scheme selected from the group consisting of:
   direct-sequence spread-spectrum (DSSS);
   frequency-hopping spread-spectrum (FHSS);
   adaptive frequency-hopping (AFH) spread-spectrum;
   time-hopping spread spectrum (THSS); and
   chirp spread spectrum (CSS).

9. The system of claim 6, wherein each thermostat operating in the high-power mode is operable to amplify received wireless signals prior to routing the received wireless signals.

10. The system of claim 1, wherein each thermostat is communicatively linked to a corresponding sensor operable to measure a parameter associated with the corresponding zone, respectively,
   wherein each thermostat is configured to receive measurement signals from the corresponding sensor, respectively, the measurement signals being indicative of sensed parameters at the corresponding zone, and
   wherein the plurality of signals communicated to the master control unit are control signals based on the measurement signals received from the plurality of thermostats, respectively.

11. A zone thermostat for use in a heating, ventilating, and air conditioning (HVAC) system having multiple zone thermostats, comprising:
   a processor operatively coupled to at least one sensor;
   a wireless communication component operable to transmit a signal indicative of a measured zone parameter measured by the at least one sensor to a master control unit associated with the HVAC system;
   a primary power source operable to supply power to the thermostat;
   an auxiliary power source operable to supply power to the zone thermostat in response to the thermostat not being powered by the primary power source;
   a power sensing circuit configured to determine whether the zone thermostat is operatively connected to and powered by the primary power source or the auxiliary power source; and
   a switching circuit communicatively linked to the power sensing circuit and configured to switch operation of the zone thermostat between a high-power mode and a low-power mode;
   wherein when the power sensing circuit determines that the zone thermostat is powered by the primary power source, the processor instructs the switching circuit to configure the zone thermostat to operate in the high-power mode as a repeating thermostat;
   wherein when the power sensing circuit determines that the zone thermostat is powered by the auxiliary power source, the processor instructs the switching circuit to configure the zone thermostat to operate in the low-power mode as a non-repeating thermostat;
   wherein when the zone thermostat is operating as the repeating thermostat in the high-power mode, the repeating thermostat is operable to receive and route control signals received from other zone thermostats, the other zone thermostats being selected from the multiple zone thermostats; and wherein when the zone thermostat is operating as the non-repeating thermostat in the low-power mode, the zone thermostat is limited to performing sensing functions and wirelessly transmitting sensed parameters of at least one zone corresponding to the zone thermostat to an exclusion of control parameters of other non-corresponding zones.

12. The zone thermostat of claim 11, wherein at least one of the other zone thermostats is operable to wirelessly communicate the control signals to the repeating thermostat, and wherein the repeating thermostat is operable to route received control signals to one of the master control unit or at least an additional repeating thermostat, the additional repeating thermostat being selected from the multiple zone thermostats.

13. The zone thermostat of claim 12, wherein at least one of the received control signals originated from a non-repeating zone thermostat.

14. The zone thermostat of claim 11, wherein, when the zone thermostat operates as the non-repeating thermostat in the low-power mode, the non-repeating thermostat is configured with at least one lesser sensing or wireless communication capability than when the zone thermostat operates as the repeating thermostat in the high-power mode.

15. A method for operating a zone thermostat in a heating, ventilating, and air conditioning (HVAC) system having multiple zone thermostats, the method comprising the steps of:

providing a zone thermostat that is configurable between a repeating thermostat and a non-repeating thermostat in a zone conditioned by the HVAC system;

actively detecting whether a primary power source or a secondary power source is supplying power to the zone thermostat;

operating the zone thermostat in a low-power mode, using power supplied from the secondary power source, and automatically switching from operating the zone thermostat as a repeating thermostat to operating the zone thermostat as a non-repeating thermostat upon detecting that the primary power source is not supplying power to the zone thermostat; and operating the zone thermostat in a high-power mode, using power supplied from the primary power source, and automatically switching from operating the zone thermostat as a non-repeating thermostat to operating the zone thermostat as a repeating thermostat upon detecting that the primary power source is supplying power to the zone thermostat;

wherein, when in the low-power mode:
configuring the zone thermostat as a non-repeating thermostat;
selectively measuring parameters in at least one corresponding zone; and
communicating wireless signals based on the measured parameters of the at least one corresponding zone to an exclusion of control parameters of other non-corresponding zones through a network to a master control unit;

wherein, when in the high-power mode:
configuring the zone thermostat as a repeating thermostat;
actively measuring the parameters in the at least one corresponding zone;
communicating signals based on the measured parameters of the at least one corresponding zone through the network to the master control unit; and
routing other signals received from other zone thermostats operating in each of the low-power mode as non-repeating thermostats and the high-power mode as repeating thermostats through the network, the other zone thermostats being selected from the multiple zone thermostats.

16. The method of claim 15, wherein, when in the low-power mode:
ignoring wireless signals communicated through the network from the other thermostats associated with the HVAC system.

17. The method of claim 16, wherein, when in the high-power mode, routing the other signals to one of the master control unit or an additional zone thermostat operating in the high-power mode, the additional zone thermostat being selected from the multiple zone thermostats.

* * * * *